United States Patent
Jahn et al.

(10) Patent No.: US 8,899,593 B2
(45) Date of Patent: Dec. 2, 2014

(54) INTERSHAFT SEAL

(71) Applicant: Rolls-Royce PLC, London (GB)

(72) Inventors: Ingo Henry Johannes Jahn, West End (AU); Christopher Davies, Derby (GB)

(73) Assignee: Rolls-Royce PLC, London (GB)

( * ) Notice: Subject to any disclaimer, the term of this patent is extended or adjusted under 35 U.S.C. 154(b) by 0 days.

(21) Appl. No.: 13/959,215

(22) Filed: Aug. 5, 2013

(65) Prior Publication Data

US 2014/0049010 A1     Feb. 20, 2014

(30) Foreign Application Priority Data

Aug. 14, 2012 (GB) .................................. 1214476.2

(51) Int. Cl.
*F16J 15/40* (2006.01)
*F16J 15/30* (2006.01)
*F16J 15/26* (2006.01)
*F16J 15/34* (2006.01)
*F16J 15/44* (2006.01)

(52) U.S. Cl.
CPC *F16J 15/30* (2013.01); *F16J 15/26* (2013.01); *F16J 15/3484* (2013.01); *F16J 15/3452* (2013.01); *F16J 15/3464* (2013.01); *F16J 15/441* (2013.01)
USPC .............................. 277/401; 277/409; 277/358

(58) Field of Classification Search
USPC ......... 277/358, 361, 362, 363, 367, 369, 399, 277/400, 401, 409
See application file for complete search history.

(56) References Cited

U.S. PATENT DOCUMENTS

| | | | | |
|---|---|---|---|---|
| 4,266,786 A | * | 5/1981 | Wiese ............................ | 277/362 |
| 7,229,076 B2 | * | 6/2007 | Kudari et al. .................. | 277/361 |
| 7,938,404 B2 | * | 5/2011 | Hagen et al. ................... | 277/369 |
| 2010/0164180 A1 | | 7/2010 | Short | |

FOREIGN PATENT DOCUMENTS

| | | |
|---|---|---|
| EP | 2 420 649 A2 | 2/2012 |
| EP | 2 508 780 A1 | 10/2012 |
| JP | 03074682 A * | 3/1991 |
| WO | WO 2010/030448 A1 | 3/2010 |

OTHER PUBLICATIONS

Search Report issued in British Patent Application No. 1214476.2 dated Oct. 31, 2012.
Search Report issued in European Patent Application No. EP 13 17 9253 dated Nov. 20, 2013.

* cited by examiner

*Primary Examiner* — Gilbert Lee
(74) *Attorney, Agent, or Firm* — Oliff PLC

(57) ABSTRACT

An intershaft seal is provided for inner and outer coaxial shafts which rotate relative to each other. The seal is located in an annular space between the shafts and maintains an axial pressure differential between a fluid pressure on a first side of the seal and a different fluid pressure on a second side of the seal. The seal includes first and second runners which project into the annular space from a first one of the shafts and extend circumferentially around the first shaft such that a cavity is formed between the runners. The seal further includes a sealing ring which is coaxial with the shafts and is located in the cavity.

12 Claims, 3 Drawing Sheets

INTERSHAFT SEAL

FIELD OF THE INVENTION

The present invention relates to an intershaft seal.

BACKGROUND OF THE INVENTION

Numerous types of intershaft seal can be used to seal between relatively rotating coaxial shafts as found e.g. in gas turbine engines. One type of intershaft seal is shown schematically in FIG. 1 and is used to seal between gas, liquid or air-gas mixtures. The seal is located between inner 37 and outer 38 coaxial shafts and maintains an axial pressure differential between high pressure fluid 31 on a first side of the seal and low pressure fluid 32 on a second side of the seal. The shafts rotate relative to each other. The seal comprises a carbon ring 35 positioned between first 33 and second 34 runners on respectively the first and second sides of the seal. The carbon ring typically has a slight clearance from the outer shaft at cold build conditions. The two runners are separated by a spacer 36, so that the axial gap between the runners is slightly longer than the axial length of the carbon ring. During operation, the carbon ring is pushed by centrifugal forces into more intimate sealing contact with the outer shaft and rotates with that shaft. First 39 and second 40 annular sealing interfaces are created between the runners and the axially spaced first 46 and second 47 end faces of the ring. The sealing interfaces provide only a small axial clearance between each end face and the respective runner.

The series of first runner 33, spacer 36 and second runner 34 is axially restrained relative to the inner shaft 37 by a ring nut 41 (or similar device) which axially clamps these components against a step formation on the inner shaft. Optionally a Belville spring 42 may be used to set the clamping load. The nut arrangement can be located on the opposite (high pressure) side of the seal to that shown in FIG. 1.

During axial movement transients, rubbing contact at the respective sealing interface 39, 40 can occur, such rubbing contact producing sufficient axial force to overcome the frictional resistance to sliding axial movement of the carbon ring 35 along the outer shaft 38. Wear of the seal occurs due to rubbing at the end faces 46, 47 of the carbon ring where these contact with the runners 33, 34. Thus an improvement to this technology is the incorporation of lift generating formations, such as V-grooves, in the surfaces of the runners at the sealing interfaces 39, 40. Such formations generate lift as the axial clearance of the sealing reduces, thereby causing the ring 35 to move axially. Ideally this lift can be sufficiently strong such that an air film is produced and no axial rubbing contact occurs under normal operation.

When the carbon ring 35 is midway between runners 33, 34, the seals formed by both sealing interfaces 39, 40 can be inadequate, leading to excessive fluid leakage across the seal. However, reducing the distance between the runners is generally not possible, as provision has to be made for thermal expansion of the ring 35 and manufacturing tolerances. More generally, due to insufficient tolerance control or due to wear of the carbon ring 35, the gaps between the carbon ring and the runners 33, 34 vary from seal to seal and also increase with use. Consequently the seal leakage characteristic varies from component to component and with time.

A development of the intershaft seal, shown schematically in FIG. 2, has the ring split into two halves 43, 44 with a spring element 45 (e.g. a wave spring) positioned between the two halves and urging the halves towards respectively the first runner and the second runner. If this arrangement is combined with lift generating formations which provide sufficient lift to overcome the spring compressive force and hydrostatic pressure acting on the ring halves 43, 44, an air-riding seal is created. Here, the axial clearances of both sealing interface can be kept to a low level (e.g. as low as 2-5 microns), while no wear occurs. Any thermal expansion and build tolerance imperfections can be compensated for by compression of the spring element. Similarly performance degradation due to carbon ring wear throughout the seal life is eliminated.

A disadvantage of the arrangement shown in FIG. 2, however, is that two ring halves 43, 44 with comparatively complicated shapes need to be manufactured and that it can be difficult to position the spring element 45 between the two halves. Significant assembly complications can also be experienced.

SUMMARY OF THE INVENTION

In a first aspect, the present invention provides an intershaft seal for inner and outer coaxial shafts which rotate relative to each other, the seal being located in an annular space between the shafts and maintaining an axial pressure differential between a fluid pressure on a first side of the seal and a different fluid pressure on a second side of the seal, the seal including:

first and second runners which project into the annular space from a first one of the shafts and extend circumferentially around the first shaft such that a cavity is formed between the runners, and a sealing ring which is coaxial with the shafts and is located in the cavity, the sealing ring having first and second axially spaced end faces, the first runner forming a first annular sealing interface with the first end face of the sealing ring and the second runner forming a second annular sealing interface with the second end face of the sealing ring, the sealing ring further making sealing contact with the second of the shafts to maintain the pressure differential;

wherein one of the runners is spring-loaded such that it is urged towards the sealing ring.

Relative to a seal in which the sealing ring is split in two halves with a spring element therebetween, the seal of this aspect can have a reduced number of components and be easier to manufacture and assemble. Nonetheless, by spring-loading one of the runners, the axial clearances of both sealing interfaces can still be kept to a low level while avoiding wear, and thermal expansion and build tolerance imperfections can still be compensated for. In addition, swash tolerance of the seal can be improved. That is, any deviations of the sealing ring ends faces and the corresponding surfaces of the runners from perpendicularity with the axis of rotation, and any non-parallelism of the axes of the shafts can be compensated for.

Further aspects of the present invention provide: (i) coaxial inner and outer shafts fitted with the intershaft seal of the first aspect, and (ii) a gas turbine engine having such coaxial inner and outer shafts.

Optional features of the invention will now be set out. These are applicable singly or in any combination with any aspect of the invention.

The runners may rotate with the first shaft.

The spring-loaded runner may be in axially sliding sealing contact with the first shaft. In this way, a seal can be maintained between the runner as it moves relative to the first shaft. For example, the runner may have a first anti-rotation formation which cooperates with a corresponding second anti-rotation formation of the first shaft to prevent or restrict rotation of the runner relative to the first shaft but allows limited axial movement of the runner relative to the first shaft. One of the anti-rotation formations can provide one or more male elements which mate with one or more corresponding female elements provided by the other anti-rotation formation. For example, the formations can take the form of interlocking spline, dog, tab or keyway arrangements.

The seal may have a spring formation such as a wave spring or bellows spring arranged to spring-load the runner. The spring element can be fixed to the runner and the first shaft, and may have sufficient torsional rigidity to prevent or restrict rotation of the runner relative to the first shaft. In this case, separate anti-rotation formations may not be needed.

The first shaft may be the inner shaft and the second shaft the outer shaft. The sealing ring can then be urged into centrifugally sealing contact with outer shaft at an outwardly facing surface of the sealing ring, e.g. starting from a slight interference fit with the outer shaft when the shafts are not rotating relative to each other.

Alternatively, however, the first shaft may be the outer shaft and the second shaft the inner shaft. The sealing ring can then be fixed in sealing contact with the inner shaft at an inwardly facing surface of the sealing ring, e.g. so that when the shafts are rotating relative to each other the sealing contact is maintained despite centrifugal loading of the ring.

Both the runners may be spring-loaded such that they are urged towards the sealing ring. With this arrangement, the sealing ring does not need to slide axially relative to the second shaft. The sealing ring can then be fixed in sealing contact, e.g. by an interference fit, to the second shaft, eliminating a possible leakage at the interface of the sealing ring and the second shaft. In addition, the swash tolerance of the seal can be increased. Alternatively, however, only one of the runners may be spring loaded.

A spring formation to spring-load the runner may be a compression spring formation located axially on the opposite side of the spring-loaded runner to the cavity. Such a spring formation can then be relatively accessible for installation and maintenance. Alternatively, however, the spring formation may be a tensile spring formation located within the cavity. In particular, if both runners are spring loaded, the same formation can then act on both runners.

The seal may further have a fluid path that extends from the first or second side of the seal to a location in the cavity at or adjacent the first shaft, the fluid path bypassing the annular sealing interface of the respective runner and allowing fluid pressure equalisation across axially spaced sides of that runner. For example, the path can extend though the respective runner, through the first shaft, or along the interface of the respective runner and the first shaft.

Another option is for the seal to have a fluid path that extends from the cavity formed between the runners and through a wall of the first shaft to a region of pressure which is intermediate the pressures on the first and second sides of the seal, the fluid path allowing the cavity to adopt the intermediate pressure.

The sealing ring can be formed of carbon or ceramic.

The first and/or the second sealing interface may be configured to generate, in use, fluid-dynamic lift which prevents or reduces sliding contact between the sealing ring and the respective runner across the interface. For example, at the or each interface, grooves may be formed in the surface of the respective runner to generate the fluid-dynamic lift.

Further optional features of the invention are set out below.

BRIEF DESCRIPTION OF THE DRAWINGS

Embodiments of the invention will now be described by way of example with reference to the accompanying drawings in which.

DETAILED DESCRIPTION AND FURTHER OPTIONAL FEATURES OF THE INVENTION

Figure 3:
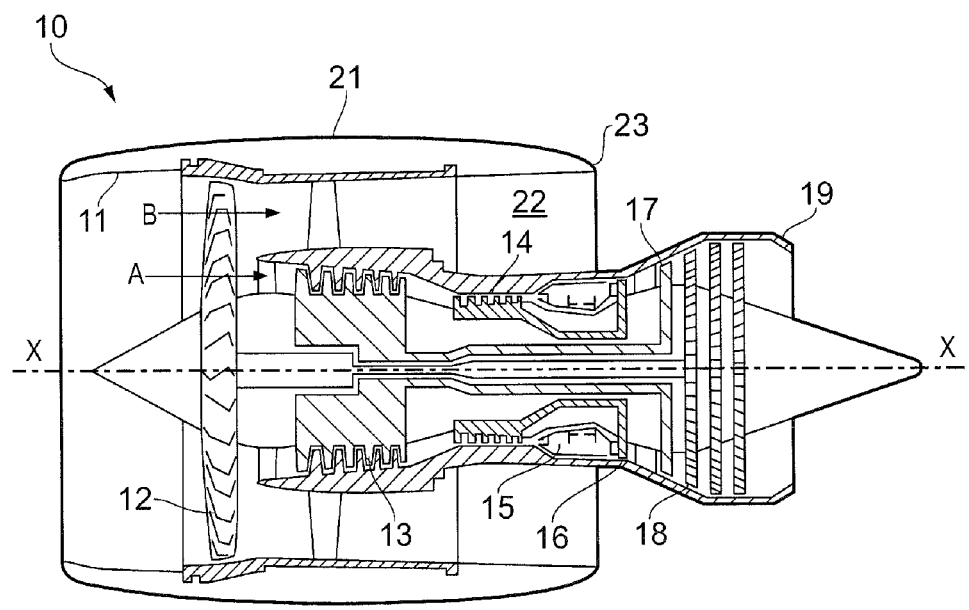
FIG. 3 shows schematically a longitudinal cross-section through a ducted fan gas turbine engine.

With reference to FIG. 3, a ducted fan gas turbine engine incorporating the invention is generally indicated at 10 and has a principal and rotational axis X-X. The engine comprises, in axial flow series, an air intake 11, a propulsive fan 12, an intermediate pressure compressor 13, a high-pressure compressor 14, combustion equipment 15, a high-pressure turbine 16, and intermediate pressure turbine 17, a low-pressure turbine 18 and a core engine exhaust nozzle 19. A nacelle 21 generally surrounds the engine 10 and defines the intake 11, a bypass duct 22 and a bypass exhaust nozzle 23.

During operation, air entering the intake 11 is accelerated by the fan 12 to produce two air flows: a first air flow A into the intermediate pressure compressor 13 and a second air flow B which passes through the bypass duct 22 to provide propulsive thrust. The intermediate pressure compressor 13 compresses the air flow A directed into it before delivering that air to the high pressure compressor 14 where further compression takes place.

The compressed air exhausted from the high-pressure compressor 14 is directed into the combustion equipment 15 where it is mixed with fuel and the mixture combusted. The resultant hot combustion products then expand through, and thereby drive the high, intermediate and low-pressure turbines 16, 17, 18 before being exhausted through the nozzle 19 to provide additional propulsive thrust. The high, intermediate and low-pressure turbines respectively drive the high and intermediate pressure compressors 14, 13 and the fan 12 by suitable interconnecting shafts.

Figure 4:
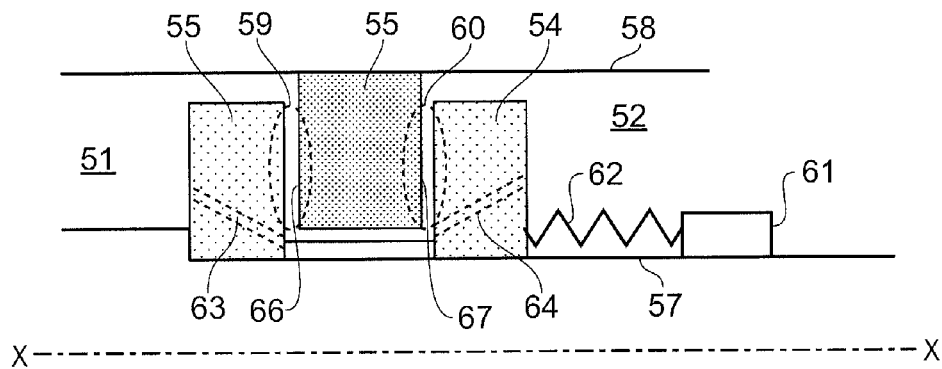
FIG. 4 shows schematically a longitudinal cross-section through an intershaft seal which can be used to seal between interconnecting shafts of the engine of FIG. 3.

FIG. 4 shows schematically a longitudinal cross-section through an intershaft seal which can be used to seal between two of the interconnecting shafts of the engine of FIG. 3.

The seal is located in the annular space between inner 57 and outer 58 coaxial shafts and maintains an axial pressure differential between high pressure air 51 on a first side of the seal and low pressure air 52 on a second side of the seal. The sealing ring of the seal has a carbon body 55 which is positioned between first 53 and second 54 runners on respectively the first and second sides of the seal (for certain applications the carbon body 55 can be replaced by a body formed of ceramic, or indeed another material). First 59 and second 60 annular sealing interfaces are created between the runners and axially spaced first 66 and second 67 end faces of the carbon body. The sealing interfaces provide only a small axial clearance between each end face and the respective runner. Lift generating formations may be formed on the surfaces of the runners 53, 54 at the annular sealing interfaces.

The sealing ring 55 is a light interference fit to the outer shaft 58 when the shafts are stationary, but is centrifugally urged into sealing engagement with the outer shaft when the shafts rotate relative to each other. Nonetheless, the sealing ring is able to slide relative to the outer shaft as needed to adjust the sealing interfaces 59, 60.

The first runner 53 is rotationally and axially fixed relative to the inner shaft 57 e.g. by locating pins, and is positioned at a step formation on the inner shaft which supports the runner against the imposition of axial loads by the other components of the seal.

The second runner 54 is in axially sliding sealing contact with the inner shaft 57. On the outward side of the second runner, a compression spring formation 62 extends between the runner and a stop formation 61, such as a ring or sleeve affixed to the inner shaft. Additional components, such as spacers, can be located between the spring formation and the second runner, e.g. to increase compliance and improve air film operation at the annular sealing interfaces 59, 60.

The second runner 54 rotates with the inner shaft 57. This can be achieved by interlocking male and female elements on the second runner and the inner shaft such as spline, dog, tab or keyway arrangements. Another option, however, is for the spring formation 62 to be sufficiently torsionally rigid such that it prevents or restricts rotation of the second runner relative to the inner shaft. For example, the spring formation can be provided by a wave spring or bellows spring.

To balance hydrostatic and hydrodynamic loads on the first 53 or second 54 runner, a channel 63, 64 can extend through the runner from the outside of the seal to a position at or adjacent the first shaft 57. This channel provides a flow path which allows the pressure drop across the respective runner to be eliminated. In FIG. 4 two channels 63, 64 are shown, but in practice only one channel would be present as two channels together form a seal leakage path.

Figure 5:
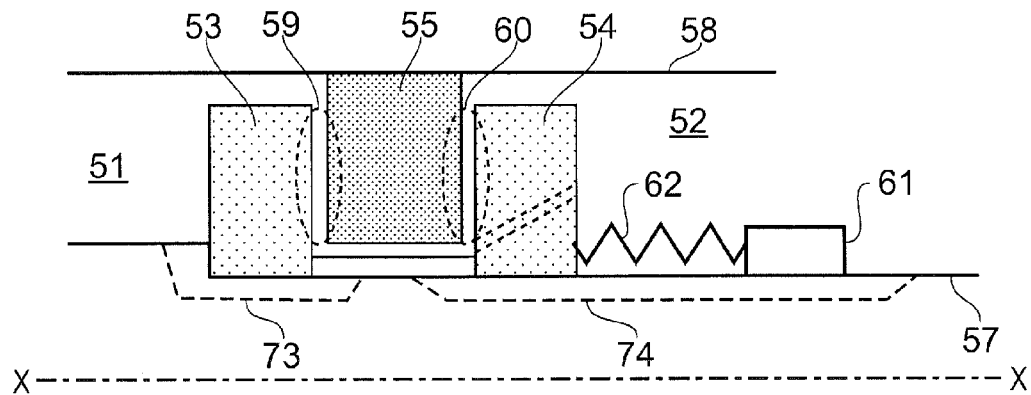
FIG. 5 shows schematically a longitudinal cross-section through another intershaft seal.

Instead of extending such a channel through one of the runners 53, 54, another option is to run a flow path through the inner shaft 57 from one side to another of the runner, or along the interface between the runner and the first shaft. FIG. 5 shows schematically, for example, a longitudinal cross-section through an intershaft seal which is similar to the seal of FIG. 4 except that an axially extending groove 73, 74 is formed in the wall of the inner shaft to act as a pressure equalising flow path. Again, in FIG. 5 two grooves are shown, but in practice only one groove would be present.

Figure 6:
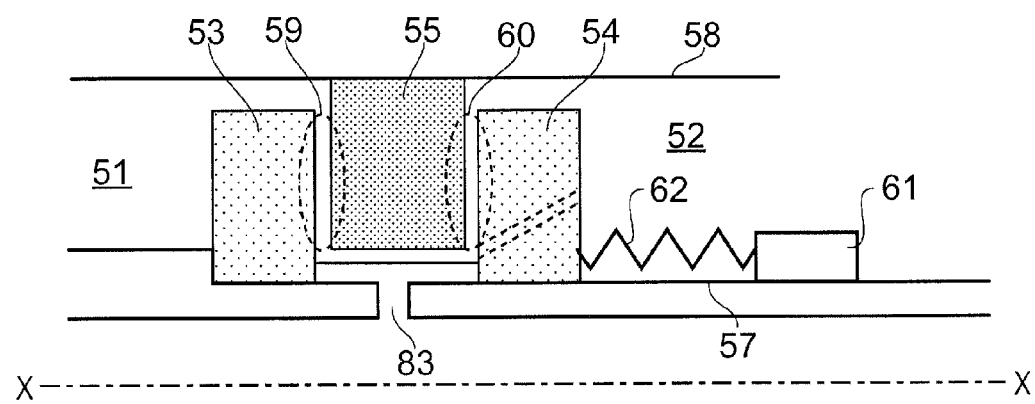
FIG. 6 shows schematically a longitudinal cross-section through another intershaft seal.

Yet another option is to link the cavity between the two runners 53, 54 to a region of intermediate pressure. For example, the region can be inside the inner shaft 57, and the flow path can then be simple hole through the wall of the first shaft, as shown schematically in FIG. 6 which is a longitudinal cross-section through an intershaft seal which is similar to the seals of FIGS. 4 and 5 except that it has such a hole 83 rather than a flow path for pressure equalisation across one of the runners.

Still another option is to spring-load both of the runners 53, 54. For example, each runner can have a respective compression spring formation on the outward side of the runner. Another possibility, however, is to have a tension spring formation which his located in the cavity between the runners, the ends of the spring formation pulling on both the runners. When both the runners are spring-loaded, relative axial movement of the shafts 57, 58 can be accommodated by runners alone, allowing the sealing ring to be e.g. an interference fit to the outer shaft, and thereby avoiding leakage at the interface of the sealing ring and the outer shaft 58.

Figure 1:
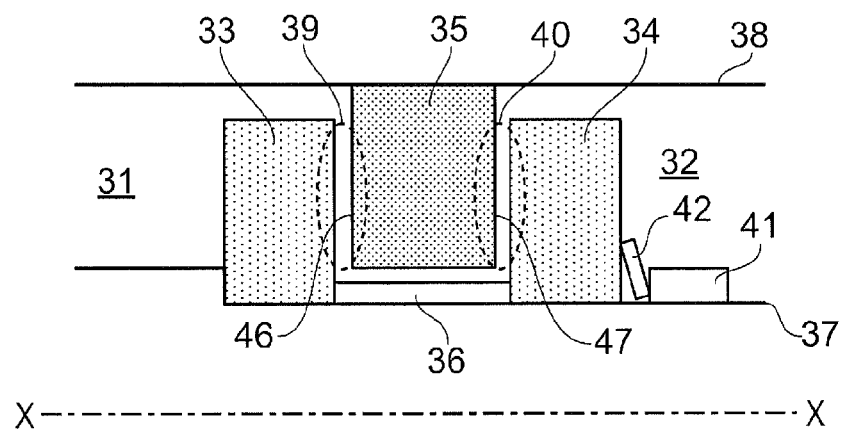
FIG. 1 shows schematically a longitudinal cross-section through an intershaft seal which seals between relatively rotating coaxial shafts.
Figure 2:
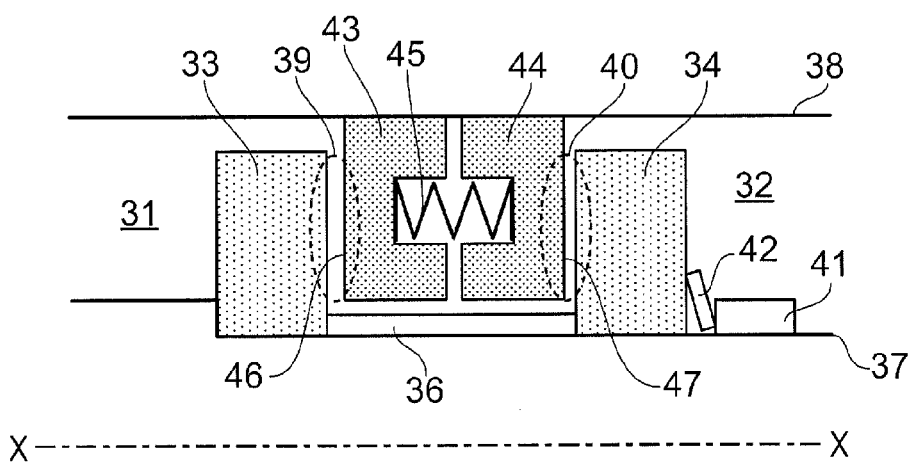
FIG. 2 shows schematically a longitudinal cross-section through another intershaft seal.

By spring-loading one or both of the runners, installation and maintenance of the seal can be simplified relative to a seal such as that shown in FIG. 2 in which the sealing ring is split in two halves. However, the seal of the present invention, by having at least one runner that is urged towards the sealing ring, retains an ability to compensate for expansion, build tolerance imperfections and sealing ring wear. The swash tolerance of the seal can also be high.

While the invention has been described in conjunction with the exemplary embodiments described above, many equivalent modifications and variations will be apparent to those skilled in the art when given this disclosure. For example, rather than having the runners project from the inner shaft, the runners may project from the outer shaft and the sealing ring can then sealingly engage with the inner shaft. Similar advantages pertain to this arrangement as pertain to the arrangement in which the runners project from the inner shaft. Accordingly, the exemplary embodiments of the invention set forth above are considered to be illustrative and not limiting. Various changes to the described embodiments may be made without departing from the spirit and scope of the invention.

The invention claimed is:

1. An intershaft seal for inner and outer coaxial shafts which rotate relative to each other, the seal being located in an annular space between the shafts and maintaining an axial pressure differential between a fluid pressure on a first side of the seal and a different fluid pressure on a second side of the seal, the seal comprising:

first and second runners which project into the annular space from a first one of the shafts and extend circumferentially around the first shaft such that a cavity is formed between the runners;

a sealing ring which is coaxial with the shafts and is located in the cavity, the sealing ring having first and second axially spaced end faces, the first runner forming a first annular sealing interface with the first end face of the sealing ring and the second runner forming a second annular sealing interface with the second end face of the sealing ring, the sealing ring further making sealing contact with the second of the shafts to maintain the pressure differential; and a fluid path that extends from (i) a side of one of the runners that is adjacent to the cavity formed between the runners, (ii) through a wall of the first shaft, and (iii) to a side of one of the runners that is adjacent to a region of pressure which is intermediate to the pressures on the first and second sides of the seal, the fluid path allowing the cavity to adopt the intermediate pressure, wherein one of the runners is spring-loaded such that it is axially sliding sealing contact with the first shaft and urged towards the sealing ring.

2. An intershaft seal according to claim 1, wherein the runners rotate with the first shaft.

3. An intershaft seal according to claim 1, wherein the first shaft is the inner shaft and the second shaft is the outer shaft.

4. An intershaft seal according to claim 1, wherein the sealing ring is urged into centrifugally sealing contact with outer shaft at an outwardly facing surface of the sealing ring.

5. An intershaft seal according to claim 1, wherein the first shaft is the outer shaft and the second shaft is the inner shaft.

6. An intershaft seal according to claim 5, wherein the sealing ring is fixed in sealing contact with the inner shaft at an inwardly facing surface of the sealing ring.

7. An intershaft seal according to claim 1, wherein both the runners are spring-loaded such that they are urged towards the sealing ring.

8. An intershaft seal according to claim 1, having a fluid path that extends from the first or second side of the seal to a location in the cavity at or adjacent the first shaft, the fluid path bypassing the annular sealing interface of the respective runner and allowing fluid pressure equalisation across axially spaced sides of that runner.

9. An intershaft seal according to claim 1, wherein the sealing ring is formed of carbon or ceramic.

10. An intershaft seal according to claim 1, wherein the first and/or the second sealing interface is configured to generate, in use, fluid-dynamic lift which prevents or reduces sliding contact between the sealing ring and the respective runner across the interface.

11. An intershaft seal according to claim 1, wherein, at the or each interface, grooves are formed in the surface of the respective runner to generate the fluid-dynamic lift.

12. Coaxial inner and outer shafts fitted with the intershaft seal of claim 1.

* * * * *